(12) United States Patent  
Rolleston (10) Patent No.: US 9,104,358 B2  
(45) Date of Patent: Aug. 11, 2015

(54) SYSTEM AND METHOD FOR DOCUMENT PRODUCTION VISUALIZATION

(75) Inventor: Robert J Rolleston, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 3292 days.

(21) Appl. No.: 11/001,431

(22) Filed: Dec. 1, 2004

(65) Prior Publication Data

US 2006/0114490 A1    Jun. 1, 2006

(51) Int. Cl.
*G06F 15/00* (2006.01)
*G06F 3/12* (2006.01)

(52) U.S. Cl.
CPC ............ *G06F 3/1285* (2013.01); *G06F 3/1207* (2013.01); *G06F 3/1208* (2013.01); *G06F 3/1256* (2013.01); *G06F 3/1275* (2013.01)

(58) Field of Classification Search
None
See application file for complete search history.

(56) References Cited

U.S. PATENT DOCUMENTS

| | | | |
|---|---|---|---|
| 4,369,013 A | 1/1983 | Abildgaard et al. | |
| 4,405,250 A | 9/1983 | Wu | |
| 5,006,396 A | 4/1991 | VanBortel et al. | |
| 5,079,808 A | 1/1992 | Brown | |
| 5,618,122 A | 4/1997 | Constantine | |
| 5,808,614 A | 9/1998 | Nagahara et al. | |
| 5,815,786 A | 9/1998 | Isemura | |
| 5,963,641 A | 10/1999 | Crandall et al. | |
| 5,988,899 A | 11/1999 | Benson et al. | |
| 6,037,949 A | 3/2000 | DeRose et al. | |
| 6,046,818 A | 4/2000 | Benson et al. | |
| 6,062,760 A | 5/2000 | Whaley | |
| 6,091,930 A * | 7/2000 | Mortimer et al. | 434/362 |
| 6,104,403 A | 8/2000 | Mukouchi et al. | |
| 6,134,568 A | 10/2000 | Tonkin et al. | |
| 6,201,546 B1 * | 3/2001 | Bodor et al. | 345/620 |
| 6,243,074 B1 | 6/2001 | Fishkin et al. | |
| 6,305,714 B1 | 10/2001 | Rosetto et al. | |
| 6,311,142 B1 | 10/2001 | Glassner | |

(Continued)

FOREIGN PATENT DOCUMENTS

| | | |
|---|---|---|
| JP | 9161097 | 6/1997 |
| JP | 2002196901 | 7/2002 |

(Continued)

OTHER PUBLICATIONS

IBM Visual Job Ticketing; IMB Printing Systems; c. IBM Corporation 2002.

(Continued)

*Primary Examiner* — Vincent Rudolph
*Assistant Examiner* — John Wallace
(74) *Attorney, Agent, or Firm* — Duane C. Basch; Basch & Nickerson LLP (57) ABSTRACT

A system and method for pre-print visualization of a job to be printed are described. The method includes submitting the content of the printing job, and associated printing environment data, in order to create a virtual rendering of the job in 3D on a user interface. In one embodiment, the rendering may be a low-resolution rendering and in another embodiment or later step, the virtual rendering would employ print-quality representations of content. The virtual rendering further allows a user to observe job-specific aspects and change a point of view relative to the rendering, including selecting and viewing individual pages of the print job. The method and system may be employed to facilitate obtaining user approval for production of the print job before forwarding the job for production.

20 Claims, 7 Drawing Sheets

(56) References Cited

U.S. PATENT DOCUMENTS

| | | | |
|---|---|---|---|
| 6,327,050 | B1 | 12/2001 | Motamed et al. |
| 6,518,963 | B1 | 2/2003 | Waupotitsch et al. |
| 6,545,680 | B1 | 4/2003 | Delas et al. |
| 6,616,702 | B1 | 9/2003 | Tonkin |
| 6,663,311 | B1 | 12/2003 | Ong |
| 6,773,216 | B2 | 8/2004 | Crudo et al. |
| 6,973,363 | B2 | 12/2005 | Masumoto et al. |
| 7,419,324 | B2 | 9/2008 | Whaley |
| 7,577,902 | B2 | 8/2009 | Hong et al. |
| 2002/0010721 | A1 | 1/2002 | Crimmins, III et al. |
| 2002/0114004 | A1 | 8/2002 | Ferlitsch |
| 2002/0116439 | A1 | 8/2002 | Someshwar et al. |
| 2002/0168249 | A1 | 11/2002 | Dim et al. |
| 2002/0171871 | A1 | 11/2002 | Catt et al. |
| 2003/0140315 | A1* | 7/2003 | Blumberg et al. ............ 715/527 |
| 2003/0189726 | A1 | 10/2003 | Kloosterman et al. |
| 2004/0066527 | A1 | 4/2004 | Kloosterman et al. |
| 2004/0111418 | A1 | 6/2004 | Nguyen et al. |
| 2005/0174349 | A1* | 8/2005 | Watson ........................ 345/427 |
| 2005/0222791 | A1 | 10/2005 | Masumoto et al. |
| 2006/0114490 | A1 | 6/2006 | Rolleston |
| 2006/0133664 | A1 | 6/2006 | Hong et al. |
| 2006/0136813 | A1 | 6/2006 | Hong et al. |
| 2007/0097203 | A1 | 5/2007 | Yamada et al. |
| 2007/0239787 | A1 | 10/2007 | Cunningham et al. |
| 2007/0240042 | A1 | 10/2007 | Sato |
| 2007/0268513 | A1 | 11/2007 | Enloe |
| 2008/0037066 | A1 | 2/2008 | Sauer |
| 2008/0141151 | A1 | 6/2008 | Saur |
| 2008/0165141 | A1 | 7/2008 | Christie |
| 2009/0222724 | A1 | 9/2009 | Stewart et al. |
| 2010/0095246 | A1 | 4/2010 | Sheperd |
| 2012/0020513 | A1 | 1/2012 | Outram |
| 2012/0081738 | A1 | 4/2012 | Seki |
| 2012/0084781 | A1 | 4/2012 | Isaka |
| 2012/0092704 | A1 | 4/2012 | Kumazawa |
| 2012/0124187 | A1 | 5/2012 | Onda et al. |
| 2012/0162202 | A1 | 6/2012 | Rolleston et al. |
| 2012/0307309 | A1 | 12/2012 | Ikegaya |
| 2013/0010326 | A1 | 1/2013 | Mochizuki |
| 2013/0076727 | A1 | 3/2013 | Rolleston et al. |
| 2013/0076728 | A1 | 3/2013 | Rolleston et al. |
| 2013/0076729 | A1 | 3/2013 | Rolleston et al. |
| 2013/0076730 | A1 | 3/2013 | Rolleston et al. |
| 2013/0076731 | A1 | 3/2013 | Rolleston et al. |
| 2013/0076734 | A1 | 3/2013 | Rolleston |
| 2013/0077113 | A1 | 3/2013 | Rolleston et al. |

FOREIGN PATENT DOCUMENTS

| | | |
|---|---|---|
| JP | 2002196901 A | 7/2002 |
| JP | 2004-005513 | 1/2004 |
| JP | 2004005513 | 1/2004 |
| JP | 2004029471 | 1/2004 |
| JP | 2004164151 | 6/2004 |
| JP | 2006185437 | 7/2006 |
| WO | WO2004/097703 | 11/2004 |
| WO | WO2004097703 | 11/2004 |

OTHER PUBLICATIONS

Dreamworks+hp web page; http://welcome.hp./com/country/us/en/msg/corp/flashdreamworks.html; c. HP Development , L.P.; Dec. 1, 2004; 1 page.

The New iPhoto web page; http://www.apple.com/ilife/iphoto; c. 2004 Apple Computer, Inc.; Dec. 1, 2004; 3 pages.

Mimeo—Your Online Print Center web page; http://www.mimeo.com/demo/demo.htm; 1-800-Go-Mimeo; c. 2001 Mimeo.com, Inc.; Dec. 1, 2004; 1 page.

Mimeo—Your Online Print Center web page; http://www.mimeo.com/enterprise/features.htm; 1-800-466-4636; c. 1999-2004 Mimeo, Inc.; Dec. 1, 2004; 4 pages.

An unofficial office action dated Aug. 24, 2010 for Japanese Patent application JP2005-348074 which corresponds to U.S. Appl. No. 11/001,431.

Abstract and machine translation of Japanese Published Application Publication JP9161097.

Abstract and machine translation of Japanese Published Application Publication JP2004029471.

Abstract and machine translation of Japanese Published Application Publication JP2004164151.

An unofficial Japanese Office Action dated Feb. 22, 2011 for Japanese Patent Application JP2005-348074 filed Dec. 1, 2005 (published Feb. 13, 2006 as JP2006-185437); corresponding to subject U.S. Appl. No. 11/001,431.

An unofficial summary of Japanese Office Action dated Feb. 22, 2011 for Japanese Patent Application JP2005-348074 filed Dec. 1, 2005 (published Feb. 13, 2006 as JP2006-185437); corresponding to subject U.S. Appl. No. 11/001,431.

An abstract and machine translation of Japanese publication JP2004-005513 published Jan. 8, 2004; Applicant: Matsushita Electric Works Ltd; Inventors Kiyotoshi et al.

Buchner, T.; Kinematics of 3D Foldiong Structures for Nanostructured Origami; MIT, Department of Mechanical Engineering; Cover + pp. 1-94; Dec. 2003.

JP2002196901 Abstract and machine translation of Japanese Publication JP2002196901 published Jul. 12, 2002; JP application 2001-274081 filed Sep. 10, 2001; Inventor Tomotoshi; Assignee Ricoh.

JP2006185437—Abstract and machine translation of Japanese Publication JP2006185437, published Jul. 13, 2006; Japanese application JP2005-348074 filed Dec. 1, 2005; Applicant Xerox Corporation; Inventor Rolleston.

Mercurio, P.J.; 3-D Hardcopy: The Hoyosa Cube; Pixel, Mar.-Apr. 1991; 7 pages un-numbered.

GB1216452.1—An Unofficial UK Search Report Issued Mar. 11, 2013 for GB1216452.1 Filed Sep. 14, 2012; Corresponding to U.S. Appl. No. 13/239,960 Inventor: Robert J. Rolleston et al.

Officemax_Office Supplies; Clips, Fasteners and Rubberbands Webpage; http://www.officemax.com/office-supplies/clips-fasteners-rubberbands, Mar. 25, 2009; 6 Pages.

U.S. Appl. No. 13/239,894—An Unofficial File History as of Feb. 5, 2015 for Co-Pending U.S. Appl. No. 13/239,894, filed Sep. 22, 2011.

U.S. Appl. No. 13/239,908—An Unofficial File History as of Feb. 5, 2015 for Co-Pending U.S. Appl. No. 13/239,908, filed Sep. 22, 2011.

U.S. Appl. No. 13/239,932—An Unofficial File History as of Feb. 5, 2015 for Co-Pending U.S. Appl. No. 13/239,932, filed Sep. 22, 2011.

U.S. Appl. No. 13/239,946—An Unofficial File History as of Feb. 5, 2015 for Co-Pending U.S. Appl. No. 13/239,946, filed Sep. 22, 2011.

U.S. Appl. No. 13/239,960—An Unofficial File History as of Feb. 5, 2015 for Co-Pending U.S. Appl. No. 13/239,960, filed Sep. 22, 2011.

U.S. Appl. No. 13/239,988—An Unofficial File History as of Feb. 5, 2015 for Co-Pending U.S. Appl. No. 13/239,988, filed Sep. 22, 2011.

U.S. Appl. No. 13/240,019—An Unofficial File History as of Feb. 5, 2015 for Co-Pending U.S. Appl. No. 13/240,019, filed Sep. 22, 2011.

U.S. Appl. No. 13/552,970—An Unofficial File History as of Feb. 5, 2015 for Co-Pending U.S. Appl. No. 13/552,970, filed Jul. 19, 2012.

* cited by examiner

SYSTEM AND METHOD FOR DOCUMENT PRODUCTION VISUALIZATION

Disclosed is a system and method for document production visualization (DPV), and more particularly, a system and method for the animated viewing of 3D images of a document, either in a final state or at several stages of the production of the document, so as to provide a representative illustration of the document for use in proofing the document before production, as well as during and after production.

BACKGROUND AND SUMMARY

The document production process is changing, and people in and outside of the printing industry are having trouble with the new short-run, variable, color, distributed, digital world. The following patents and examples are related to the pre-print specification of document production parameters:

U.S. Pat. No. 6,134,568 and U.S. Pat. No. 6,616,702, both to Tonkin, are directed to selecting components for assembly of a document, and previewing a simulation of an assembled document prior to physical assembly thereof.

Examples of other systems directed to print processing include: (a) HP Instant Delivery Service (www.instant-delivery.com), a service from Hewlett Packard Company provided to enable a Job Receiver to download and print jobs stored as web contents; (b) an ExViewer™ service provided by Mimeo (www.mimeo.com) allowing a user to pre-define document production parameters using the Internet; and (c) the IBM Visual Job Ticket described at http://www.printers.ibm.com/internet/wwsites.nsf/vwwebpublished/vjthome_ww The printing industry is in a rapid state of change. The economics of printing are forcing print manufactures to adopt such practices as Lean Manufacturing and Computer Integrated Manufacturing (CIM) from order entry to delivery and invoice. The Job Definition Format (JDF) and Job Management Format (JMF) are two technical standards being proposed to help ease the flow of data, information, and content within and among the printing industry. The JDF/JMF standards are perceived as enablers for the printing industry to move to a CIM type of production process.

Predictably, the industry is looking for ways to improve how it conducts business. Included in improvements are ways to reduce production costs and improve efficiency. A goal of the disclosed system and method is to transform the current production print practice by creating an easy to use document production visualization system. This will be done by allowing print providers of any skill level, with minimum training, to see what the customer has specified and what they are supposed to do, and to preview the results of their actions all in a realistic 3D context—thus saving the time and expense of re-work.

The system and method disclosed and referred to herein as Document Production Visualization or DPV, has the value of allowing print buyers and print suppliers to deal with the growing complexity of the data and information associated with on-demand digital printing. Moreover, the system leverages the "virtual reality" computing power typically available on today's computer workstations. One aspect of DPV is the virtual rendering of the document being described by JDF or similar standardized input. This virtual rendering has the advantage of being able to "see" and manipulate in 3D, the document before time and materials are committed to the production process. The document can be viewed, as it should appear in a final, finished form, or at any stage of a production process.

DPV can assist print buyers and print manufactures by allowing the two to adapt CIM and JDF/JMF technologies, but with the aid of visualization tools—thereby avoiding both having to understand the complexity of the formats and associated data, or the information behind these technologies. DPV is intended to combine the functionality of computer-aided drawing and computer-integrated manufacturing to produce a system where a user (e.g., customer, print shop manager, pressman, quality inspector) is able to see a 3D rendering of the document, and interactively change the view, open and turn pages, etc. so that the look and feel of the document can be appreciated before the document is released for production printing.

Disclosed in an embodiment herein is a method for pre-print visualization of a job to be printed, comprising the steps of: submitting all content of the print job; virtual rendering of the job in 3D on a user interface using print-quality representations of content, where a user can observe job-specific aspects and change a point of view relative to the rendering, said virtual rendering step further including selecting and viewing individual pages of the print job; receiving user approval for production of the print job; and signaling such approval and forwarding the print job and virtual rendering for production of the print job.

Disclosed in another embodiment herein is a method for processing a print job by a pre-print virtual rendering system, the method comprising: receiving a print job request in a job definition format, the job definition format identifying a set of print job aspects to be completed during execution of the print job; retrieving data defining at least one printing environment; submitting the print job and data defining at least one printing environment to a virtual rendering system, said virtual rendering system representing at least a subset of the print job aspects in a 3D display format such that a user can observe the print job aspects and change a point of view relative to the rendering; obtaining user approval for production of the print job as depicted in the virtual rendering; and forwarding the print job and virtual rendering for production of the print job.

Also disclosed in a further embodiment is a pre-print virtual rendering system, comprising: a print job request in a job definition format, the job definition format identifying a set of print job aspects to be completed during execution of the print job; memory for storing the print job and data defining at least one printing environment in which the print job will be rendered; a video display system having a video processor and video display; a processor operatively associated with said video display system, operating in response to pre-programmed instructions and at least one aspect of the print job as defined by the job definition format, to create at least one 3D display object, where said object is rendered by the video display system in accordance with the print job aspect; a user-interface, operatively associated with said processor, for displaying the at least one 3D display object from a plurality of perspectives in response to a user's input, sending in response to a user's selection, a signal to said processor, wherein said signal indicates user approval for production of the print job as depicted in the virtual rendering; and said processor, in response to the user approval, operating to forward the print job for production. It will be further appreciated that the virtual rendering system may operate in a local or distributed environment, where it is possible to send the virtual rendering over a network for remote approval and editing.

The DPV system and method described herein are advantageous because they make it unnecessary to produce and provide proof versions of a document to be printed, yet enable a similar level of review and approval. In addition, they can be used to monitor the production process, and as a quality control feature, enable the actual job to be compared to the virtually rendered output in order to identify any errors. These techniques are advantageous because they provide a range of alternatives, each of which is useful in appropriate situations, while permitting efficient pre-print processing of a print job. As a result of the DPV system and method, customer and printers will find themselves in a position to quickly reach approval of desired aspects for a print job, while eliminating any possibility of ambiguity. In essence, the virtual rendering may be so detailed as to modify or become a surrogate for a job ticket or similar document print request.

The method and apparatus will be described in connection with a preferred embodiment, however, it will be understood that there is no intent to limit the invention to the embodiment described. On the contrary, the intent is to cover all alternatives, modifications, and equivalents as may be included within the spirit and scope defined by the appended claims.

DETAILED DESCRIPTION

For a general understanding of the present invention, reference is made to the drawings. In the drawings, like reference numerals have been used throughout to designate identical elements. As used herein, the term "page" is generally employed to refer not only to printed sheets of a document, but also to those sheets or pages having additional or alternative features or characteristics, such as covers, tabs, special inserts, fold-outs, etc. The author and publisher are the customers who write the text, select and specify the images, assemble the pieces of the document and deliver the content to a commercial printer. The author and publisher are, for purposes of the following description, included in the same role because they probably would use the document production visualization system in the same way. For example, to specify what it is they want the document to look like as it comes out of production. The visualized document becomes an intent specification. The virtual rendering, as described below, would also be used by the author/published as a design aid, helping to answer the question, "Do I want it to look like this or that?" This type of user might also use the document production visualization system to do a soft proof at the print shop. In that scenario, the print shop front desk would run the virtual rendering and work with the author to reach concurrence on what the final product should look like; thus, the visualized document becomes a description for the contracted product.

Figure 4:
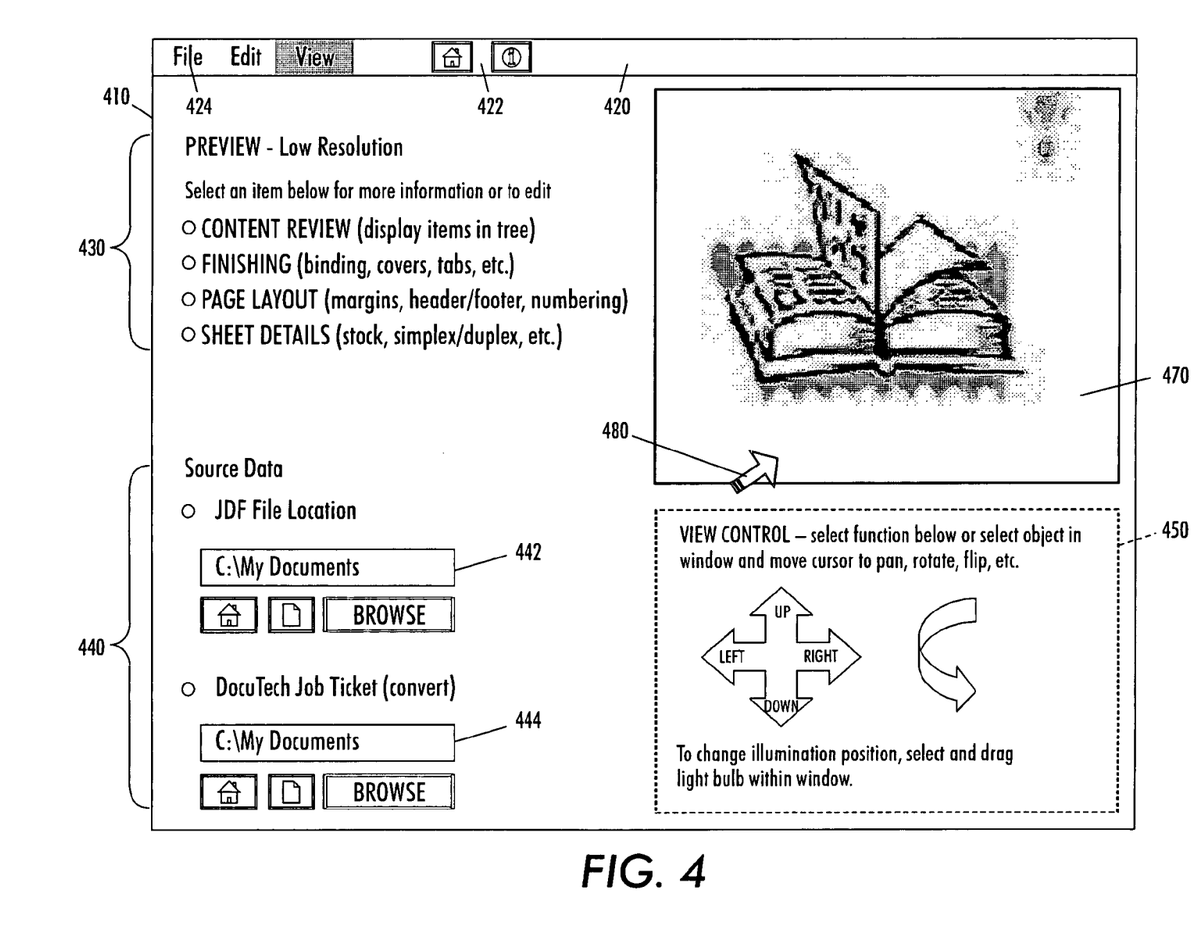
FIGS. 4-7 are exemplary user-interface screens in accordance with the method and apparatus disclosed herein.
Figure 7:
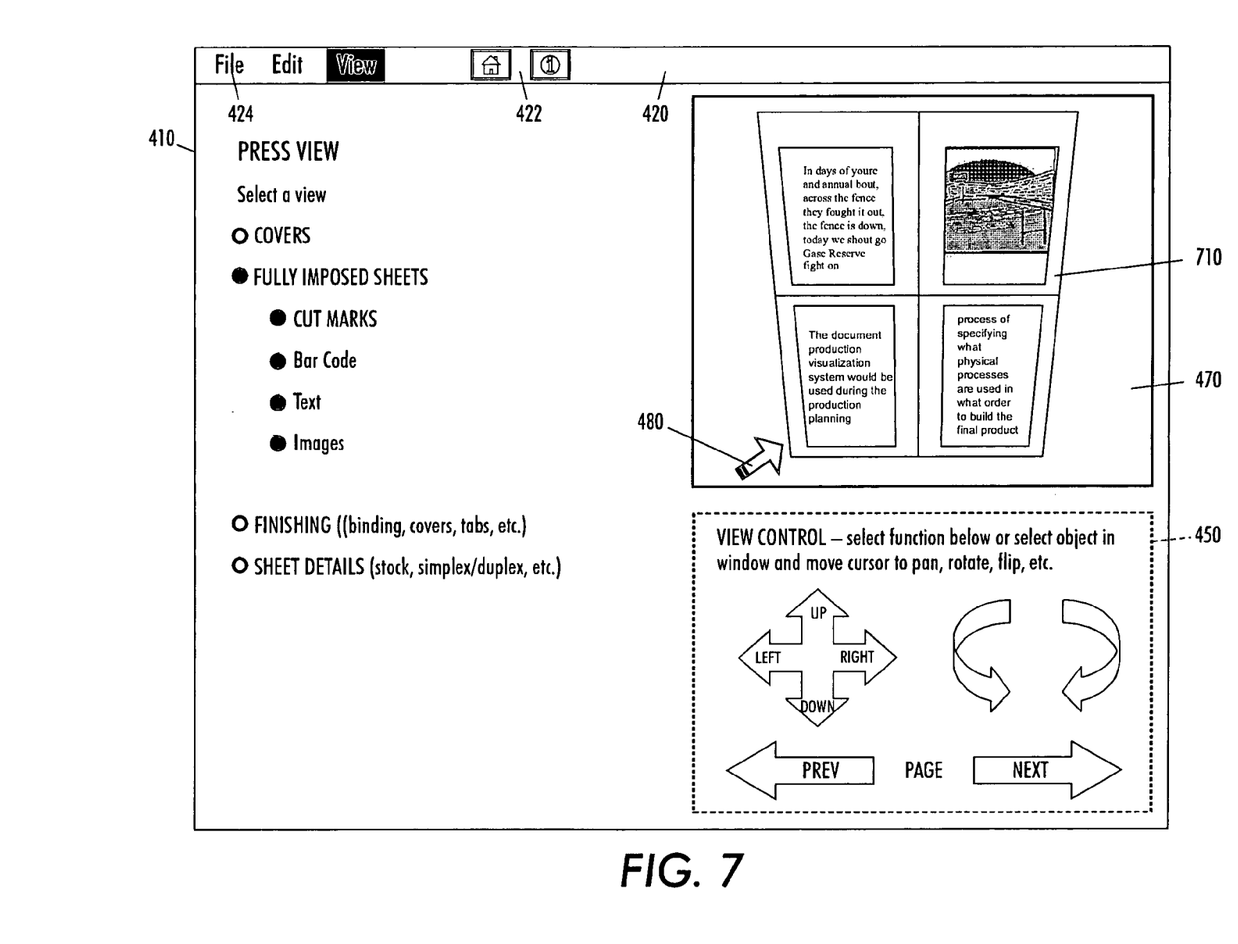

The document production visualization system would be used during the production planning process of specifying what physical processes are used in what order to build the final product. The system and method described herein is not intended as a planning tool but displays a virtual rendering of the finished document after a job has been planned. For example, in the production of a book, as illustrated in FIG. 4, the production planner would be able to view multiple aspects of the book at various stages in the production process. Examples might include a view of the cover as it comes off of the color press including trim marks and bar codes, and the fully imposed sheets as they come off of the press again with cut marks and bar codes as illustrated in FIG. 7. Accordingly, potential print manufacturer users range from general commercial printers, in-plant printers/CRDs, book publishers and quick printers.

Figure 1:
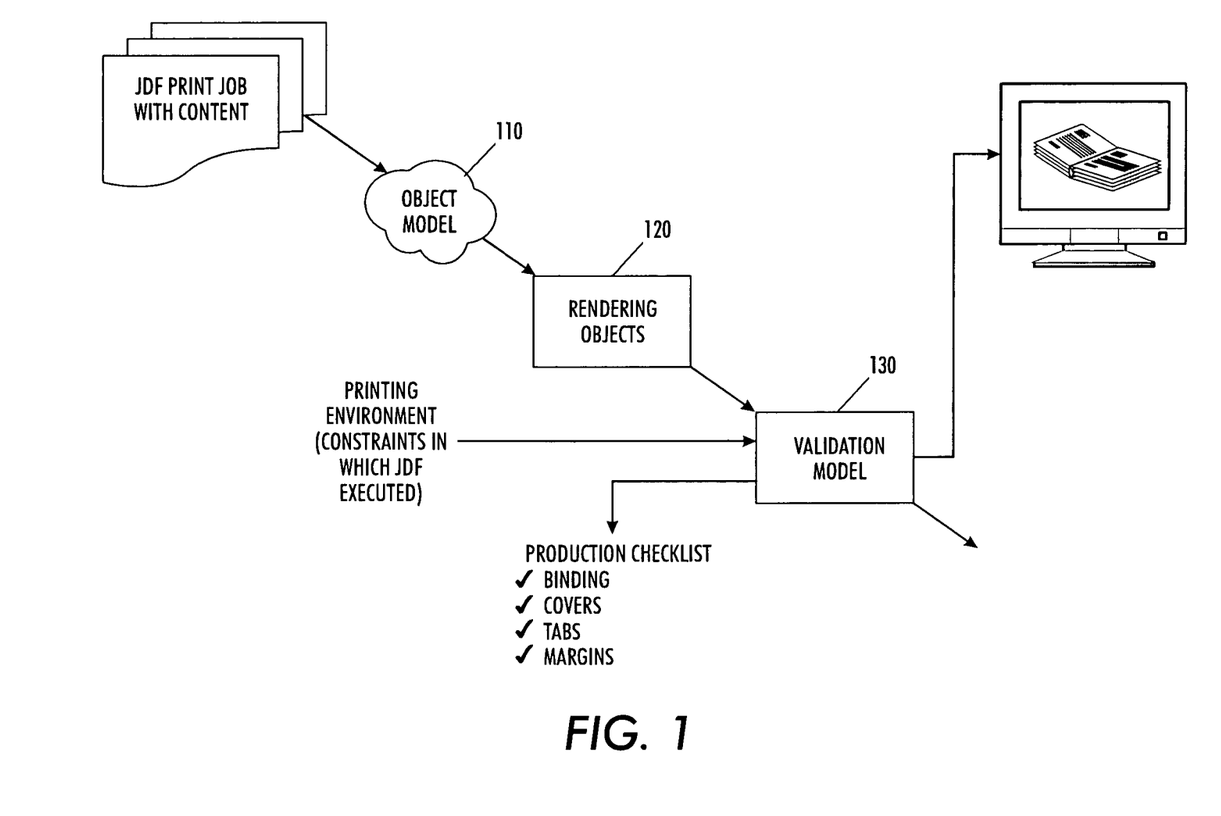
FIG. 1 is an overview of the architecture of the DPV system.

Having described a possible set of users for the DPV system, attention is turned to FIG. 1 where a generalized illustration of the technology architecture involved in the DPV system is illustrated. The four basic technologies involved in DPV are (1) an integration of an object model 110 that comprehends things in the printing domain, (2) a graphics rendering technology 120 that leverages existing standards and components, (3) a validation model 130 that knows how to test for validity of jobs and user operations, and (4) an integration with external services. Moreover, the environment in which the JDF print job is to be rendered is taken into consideration as part of the validation model (and may also have implications relative to the actual virtual rendering of the print job). For example, the integration would receive input (stored or real-time) and would modify or at least identify any JDF requirements that could not be met by the system. This is not to say that the visualization would not be possible, but that it may either be altered, or other means of communicating the printing environment limitations would be provided.

As described herein, the system would leverage graphics visualization standards such as DirectX or JAVA 3D, and job/document descriptions such as JDF (Job Definition Format). The object model function operates in finding a description that can bridge between the JDF and graphics models. For purposes of illustration, the following disclosure will be focused on the production of a "book"; although similar points of discussion could focus on any type of finished document.

The method and system for DPV are intended to utilize the virtual rendering, exposed through a GUI, to provide validation that the production process satisfies the intent specification; emphasizing the results of accepting default settings, possible errors and violations of the customer requirements. The output of production planning step then becomes the intent specification for production.

The production operator (pressman) would be able to use the visualization of the job, perhaps through a similar GUI, to verify that the image, page, sheet, or book looks like what it is supposed to, providing a quick quality check for the job. Visual verification may simplify this process allowing less skilled labor to verify printed document and/or and report problems. Visual selection of problem areas is more intuitive than typing a report and this user should be able to 'mark up' a visualized version showing where the problem areas with a book are.

As will be described in more detail below, the graphical representation of the book is a critical aspect in creating a user interface for the DPV System. The interface must be interactive so that the user is able to explore all interesting aspects of the book, and may include external features such as lighting or display environment in which the book or document is to be used (e.g., auto repair manual versus novel). Accordingly, one aspect of the disclosure is directed to a user interface model that allows users to interact with the book as though it were a book (e.g., to open and close the book, turn pages, and view all sides of the book from various angles or points of view, and under different lighting conditions).

There are some non-visual aspects of books and jobs that may be also considered of value to some customers. Some examples of such aspects include:

The glue in the binding behaves differently over time (stiffness and noise when stressed), and has a smell.

The weight of the paper stock has an enormous impact on the sensor experience of interacting with a book.

A simulation that doesn't fairly represent the safety aspects of a product may become a liability if an injury takes place. e.g. paper stocks with sharp edges Marks on paper are sometimes tactile. Braille and embossing certainly are.

Books age differently and some high quality graphics arts products may be required to survive to a particular age, so an aging aspect may be required.

Indicating a toner is a magnetic ink character recognition (MICR) type.

It should also be appreciated that the complete book view is not the only way to visualize a job. As noted above and depicted with respect to FIG. 7, production planning, and operators in particular, need to look at the book differently than the buyer. Hence the user interface may support viewing multiple aspects of a book or job, at various points of the production process. When the book or job is changed the different views may change simultaneously as well. The user needs to be informed when there is a problem with the change that is best seen in a different view. An example of this is increasing the stock weight and thus exceeding the binding's capacity.

Also, the validation model needs to work in conjunction with the rendering of objects in order to handle situations where one aspect of the book impacts how another is rendered, but the display model for the other is unaware how to render itself in the context of the first. The display or rendering model may operate in one of two possible modes, where it either reports where the visualization is inaccurate, or otherwise depicts the problem. The system would then allow the user to decide how many, or how severe, errors will be tolerated before indicators are raised. An exemplary scenario would be an ultra-violet light model that is added as a display option to facilitate a user viewing particular features (e.g., glow-in-the-dark toner or ink) but the toner models were not devised so as to render themselves in ultraviolet light. In such situations, the system could either report the visualization limit to a user, or otherwise depict the limitation (e.g., highlighting those portions of the document where glow-in-the-dark toner is used. As a further illustration of this point, consider that the system would preferably be able to illustrate substrate gloss, variations in toner/ink gloss, intended finishing operations, etc. Similarly, the system might enable a channel binder model, but the paper models fail to indicate how to handle deflection of the sheets from binder compression.

As noted above, one feature of the virtual rendering may be its use in validating aspects of the job depending on whom the user is, and at multiple levels such as book, sheet, page, image, font, and rendering. When the DPV system detects an unusual condition via the validation model, such as three-hole punching a case bound book, it needs to be able to display error conditions that get the attention of the user. These error condition reports will also support interaction or editing so as to enable the user to correct the job before submission. Further examples of errors that may be detected include:

Reporting that a requested operation will not work or will violate a customer requirement. Example: trimming a book that is supposed to have rough edges.

If the printing process selected isn't able to reproduce a required color, an error should be displayed.

If the number of pages in the document is not compatible with the binding type requested The virtual rendering system described below may also offer a compromise of high quality rendering verses rapid (lower-resolution) rendering. Some host computers may not be able to support rendering of some aspects without causing an intolerable wait. DirectX typically attempts to render the complex graphic using software simulation where hardware support is not available. Some of the graphics models may call for pre-compilation of model data so that the graphics engine doesn't need to compute it. In gaming situations this is acceptable because the models and display conditions are all known ahead of time but in the virtual rendering it may not be possible to anticipate every display option. Alternatively, the virtual rendering features may be implemented via direct hardware access.

The model needs to support validation of a job at multiple levels and for different users. The validation, depending upon user, may take different forms, although prior to production submission the validation requirements for all should be considered. For example, if an author/publisher is using the system then it will validate at the logical book level: three-hole punch and case binding does not make sense, and validate at the process level: the printer this book will be printed by does not handle burnt edge paper stock Indicated by the printing environment data). Whereas, if a production planner is using the tool then validate against the author's intent: do not specify spiral binding if they wanted perfect binding, and validate at the process level: paper stock not handled, specified finishing not available.

The system and method described herein may also contemplate default parameters that are used. In other words, the model needs to behave reasonably when information is unspecified or unavailable. Print shops may want to configure the default behavior in the event that JDF processes do not provide the same levels of detail as the output machines are capable of. The model may allow for either to be used. The virtual rendering can only be as accurate as the information it has about the actual production processes used. For example, if the Postscript engine used in the virtual rendering is different than the Postscript engine used in the final production, then the virtual rendering may display the images incorrectly. The system may, therefore, need to capture assumptions made by the virtual rendering model and validate them downstream, or to pass downstream process information upstream for association with the virtual rendering model.

Figure 2:
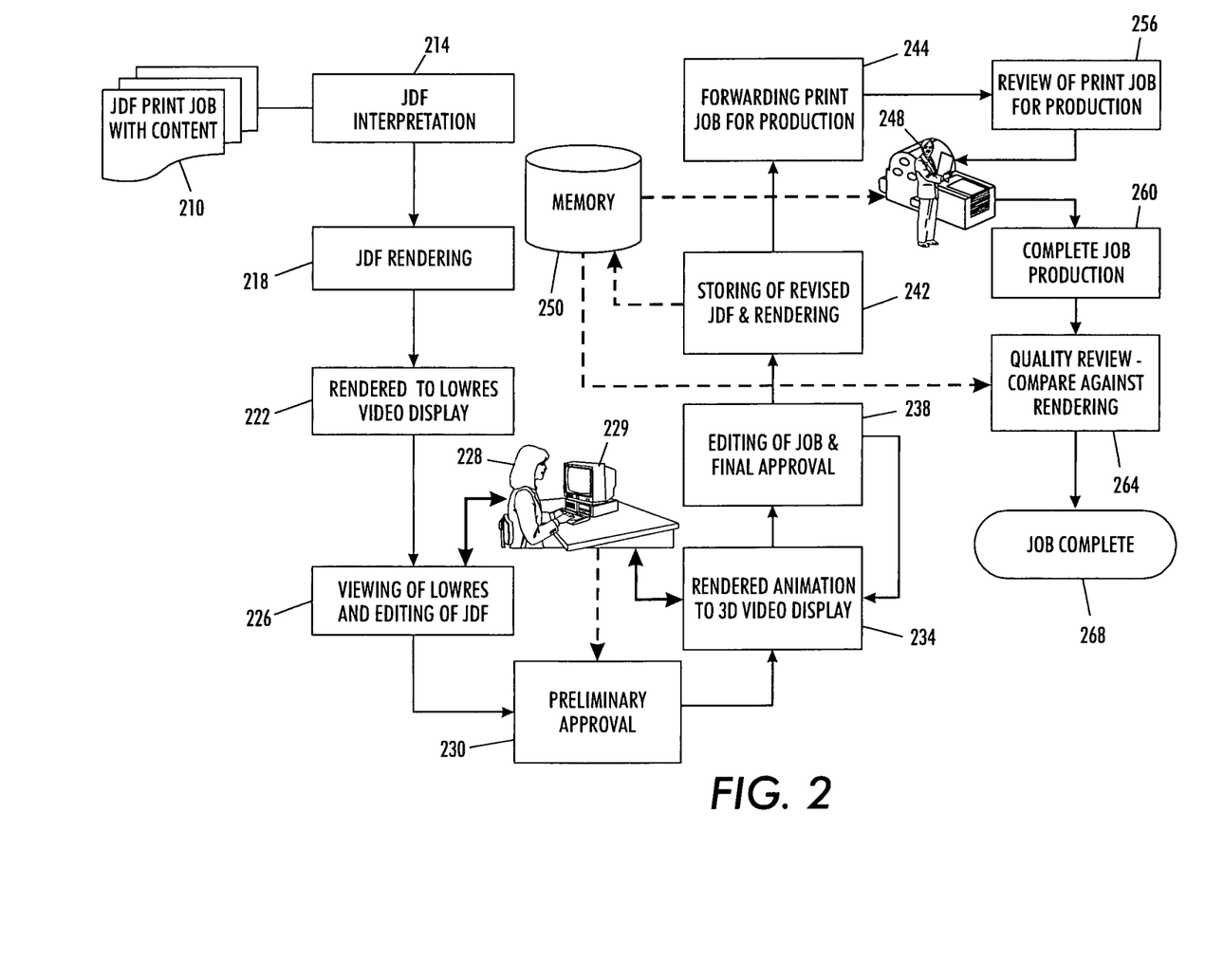
FIG. 2 is a general overview of a process in which the DPV system and method find particular use.

Having described the overall system and various features and functions that are likely to incorporated in the system, attention is now turned to en exemplary method employed in accordance with the system. Referring to FIG. 2, there is displayed a general flowchart depicting various steps that a DPV system may be expected to perform.

As illustrated, an end user submitting content and requirements for printing initiates the process. In one embodiment, the data is provided as a JDF print job 210, which is then passed to an interpretation operation 214, and the JDF data is parsed and converted into objects. Next, at step 218, the various objects are identified for rendering. The objects may then be rendered in a low-resolution display mode (e.g., FIG. 4), where the content is depicted but not in an output-equivalent format. Viewing of the low-resolution image is then provided via step 226, and the user 228 is allowed to view the low-resolution rendering for a preliminary approval 230. It will be appreciated that the low-resolution rendering and approval steps 222-230 may not be required in all embodiments, but it is believed that the low-resolution mode will enable rapid customer interaction and selection of various options relative to the production operation. Moreover, it is contemplated, as noted above, that full rendering may be slightly more time consuming and may inherently need to be limited to jobs that have been "previewed."

Once the job has been previewed it is rendered at a higher resolution and is available for viewing in a three-dimensional (3D) mode via the workstation 229. Using workstation 229, as will be described relative to FIGS. 4-6, the user is able to review the job and the various parameters previously set forth. Steps 234 and 238 specifically contemplate an interactive and iterative process wherein the user is able to view and edit or alter the job parameters, and then see the results of the modifications. After user approval, the JDF data for the approved job is stored, step 242, as is the rendering information, so that the JDF and rendering data may be available for subsequent use/display by others in the production process.

The print job is subsequently forwarded for scheduling as a production job, step 244, and is then available for review by the pressman 248. As noted above, the pressman may utilize the virtual rendering functionality to review the job. Moreover, it is contemplated that the pressman may utilize an alternative rendering so as to review details of the printing job that were not available for display to the customer as a user; for example FIG. 7, where the pressman might be able to review multi-page layouts prior to folding/cutting of the signature pages.

After the pressman's review, the job would enter a production step 260, and then a quality review step 264. It will again be appreciated that the quality review may be accomplished following or in conjunction with the job production step. Once the final document (book) is reviewed, the job is complete as indicated by step 268. As previously noted, one advantage of the present system is that the virtual rendering may serve as the surrogate "standard" or specification for the job, and against which the actual product is to be measured or compared.

Figure 3:
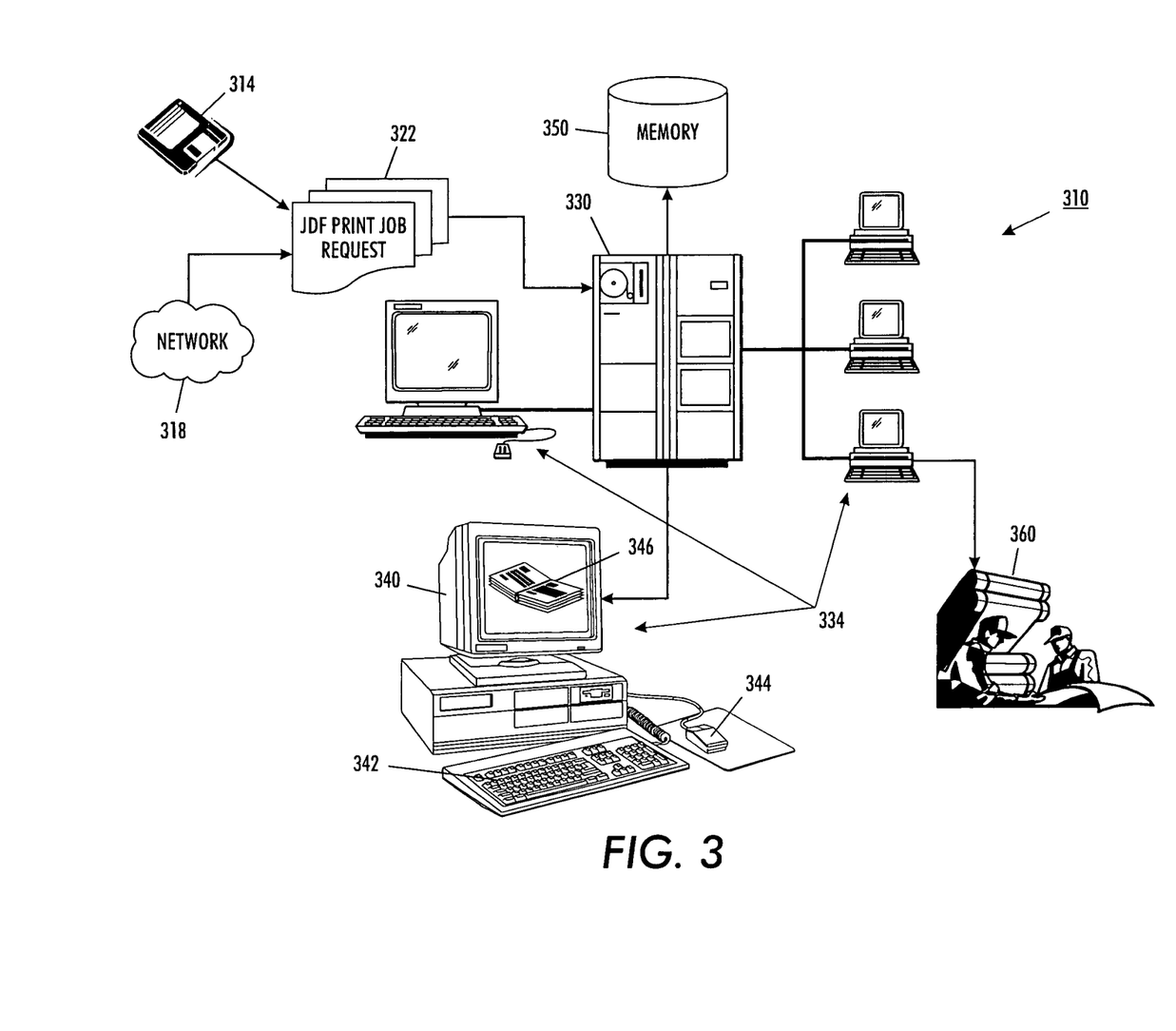
FIG. 3 is a general illustration of a system for carrying out the process depicted in FIG. 1.

Turning next to FIG. 3, there is depicted an exemplary system 310 on which the previously described method and features may be implemented. It is to be understood that certain aspects of the system would operate in accordance with pre-programmed instructions used to operate a local or networked computer system to carry out such features—perhaps on a plurality of interconnected computers at a time. Such a system might include a commercially available personal computer with appropriate graphics rendering capability, that can also be associated with a networked storage medium or similar memory device wherein the system is accessible, perhaps via an Internet or intranet for submission of print jobs. It is also contemplated that one or more aspects of the system may be implemented on a dedicated computer workstation.

As described with respect to FIG. 2, the content for a printing job is initially provided by the customer in a form acceptable to the system. Although depicted as a disk 314 or an Internet connection 318, it will be appreciated that various media and communication techniques may be available for a customer to supply the necessary content in a digital form. The content and specification for the customer's job would, however, need to be converted to a standard format such as JDF, which uses an extensible markup language (XML) to define the content of, and processes for, the creation of the printed document(s).

Networked DPV processor 330 operates in accordance with suitable pre-programmed software to store the JDF data in a memory 350 and to carry out the conversion of the JDF data to suitable objects for virtual rendering on a workstation 334. Workstation 334 provides the user interface in the form of a display 340, a keyboard 342 and a mouse 344 or similar pointing device. As illustrated in FIGS. 4-7, workstation 334 provides a display suitable for providing a virtual rendering of the document (book) for review by the user. As described with respect to FIG. 2, once the author/publisher of the document has approved the virtual rendering 346 for production, the approved JDF and associated virtual rendering data is again stored or updated on memory 350. Subsequently, the pressman or production planner may access the stored information to review the job—prior to, during and after production on the printer 360.

Turning next to FIGS. 4-7, displayed therein are various features and functionality associated with the user interface display 410 for several embodiments of the DPV system. It will be appreciated that the various features may be combined in alternative fashions and that some features may or may not be present in various interface views for purposes of illustration. Moreover, several alternative views are presented in order to illustrate functionality enabled by the interface without an intent to limit the same.

Referring specifically to FIG. 4, interface display 410 includes one or more toolbars 420, a detailed job data field 430, a data source specification 440, and a view control region 450 that us used to control the 3D view of the job as rendered in window 470, where there is depicted a low-resolution or black/white only view of the print job. Toolbar 420 preferably includes control buttons 422 (e.g., reset, information) as well as pull-down menu buttons 424 (e.g., File, Edit, View). In the job data field, a menu or scrollable, hierarchical view of the various settings for the job may be reviewed. Here, the intent is to provide a general indication of the job parameters, and the user would be able to edit or modify the parameters so as to modify both the job specification and the view of the job depicted in the rendering window 470. The image depicted in window 470 is purposely low resolution so as to enable timely updates in response to the user's selection or changing of parameters in job data field 430.

Also found on interface 410 is a data source specification region 440, where the source, or alternatively the storage location, of the job data may be specified in field 442. This would enable a user to select a pre-existing job for further modification. As illustrated, region 440 may include functionality for specification of an input JDF file, via a default (home) selection button or a browse button that would permit the user to view files on a local or networked drive. Although not specifically illustrated, the system and associated method may further include the ability to characterize and store printing environment information in memory (250, 350). Such a feature would enable a user to identify and illustrate particular characteristics of the print job that would be impacted by the printer or print environment. It will be appreciated that the user-interface of FIG. 4 may include, in region 440, fields allowing a user to specify the location of the print environment data file(s).

Also contemplated by an aspect of the present invention is that a user may specify the location of a pre-existing job ticket or similar job description file (field 444), and the system will retrieve the information, process it for conversion to a JDF or similar format, and then render the low-resolution version of the job in window 470. It will be further appreciated that in such conversion operations certain default settings may need to be employed, and that defaults may need to be flagged or otherwise indicated to a user.

In the lower right region of the display 410 is a view control region 450 that is associated with rendering window 470. The view control may be implemented as a toolbar-like region, where the functionality may be provided at the user's request, and where similar functionality to that depicted may be provided simply by the user's movement of a cursor 480 within the rendering window. Such techniques are well-known in CAD/CAM systems for the manipulation of 3D objects.

Figure 5:
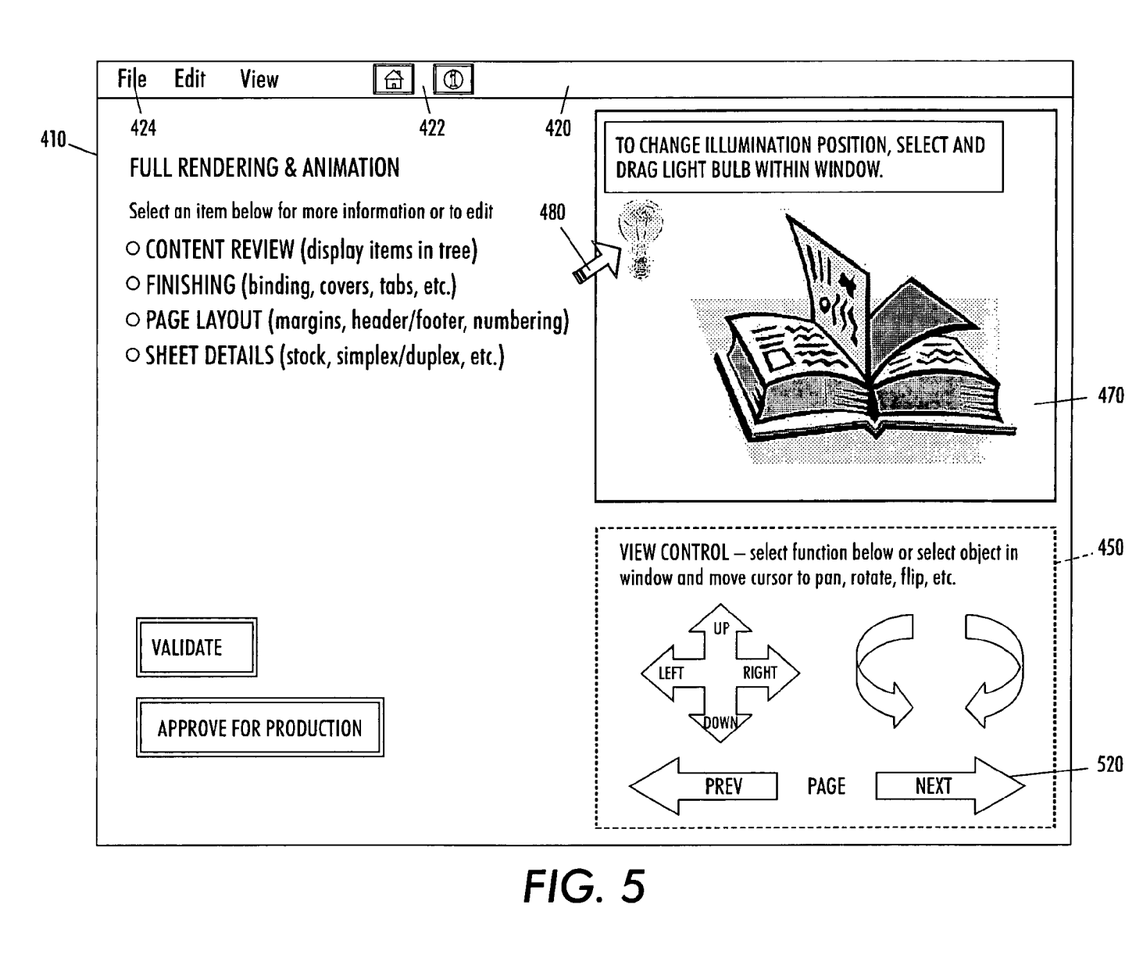

Referring also to FIG. 5, like FIG. 4, this display 410 includes several similar features, but is intended to better illustrate a full-resolution rendering of the print job. One aspect depicted in FIG. 5 is where the viewing of individual pages is accomplished via page controls 520. The interface controls would be implemented in accordance with animation of a page-turning process, so that a user may not only observe the individual pages, but may also observe the page as turned, and how it will appear during such turning. Further, in comparing with rendering windows 470 of FIGS. 5 and 6, it will be apparent that the system enables the animated appearance of the page being controlled in accordance with the aspects of the job. For example a spiral bound document, edge bound document, or a document stapled in upper-left corner, all have different aspects of how the pages will look when one flips to the middle of the printed document. These distinctions can be illustrated in accordance with the rendering objects based upon the particular parameters for the job.

Figure 6:
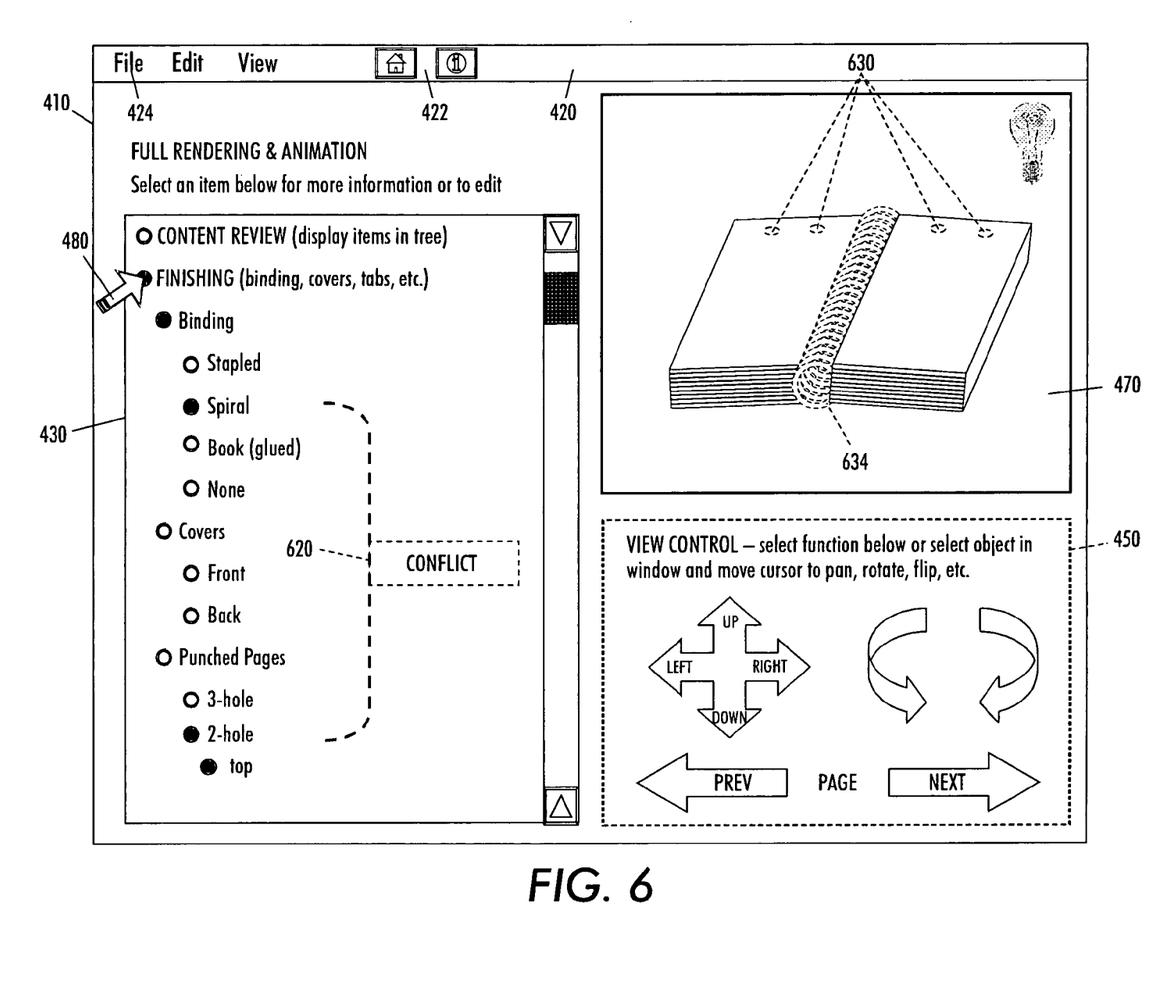

Turning to FIG. 6, the job data field 430, may be used to not only edit or modify the job parameters, but may also be employed to indicated, as represented by message 620, the presence of errors or conflicts detected by the validation model. In other words, the DPV system may further detect an unusual or error condition in the job parameters, such as two-hole punching the top of a spiral bound book. And, the system may indicate or display displaying such conditions via the user interface in order to get the attention of the user. For example, conflicts may be illustrated in the virtual rendering of region 470 by flashing the potentially conflicting elements of the document (e.g., top-punched holes 630 and spiral binding 634), showing it in a highly contrasting color, or showing it only as a skeleton or outline view. Other examples of similar functionality include: (a) reporting that a requested operation will not work or will violate a customer requirement (e.g., trimming a book that is supposed to have rough edges); (b) when the printing process selected is unable to reproduce a required color, an error should be displayed; of (c) if the number of pages in the document is not compatible with the binding type requested. In view of the examples of conflicts, it should be understood that the term conflict is used herein to characterize both types of rendering problems, including: (a) "internal" conflicts between specified aspects of the print job itself, and (b) "printing" conflicts between the desired print conditions and those available in the printing environment.

Referring lastly to FIG. 7, there is illustrated an exemplary representation of a virtual rendering in window 470 of a print layout sheet 710, so that while producing the print job, a press operator may concurrently view the job in one of a plurality of stages during production. It is believed that this view will enable the checking of the job during its progress, thereby improving the likelihood of a successful run and minimizing the possibility of errors. As will be appreciated by a comparison of the various virtual renderings in FIG. 4-7, the DPV system contemplates the virtual rendering being used to validate aspects of the job as a function of the type of user (e.g., customer (author/publisher), pre-production review, production pressman, quality review). Furthermore, the virtual rendering may be used to validate aspects of the job at a plurality of levels—such as book, sheet, page, image, font, and rendering.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for pre-print visualization of a job to be printed, comprising:
submitting all content of the print job;
virtual rendering of the job in 3D on a user interface using print-quality representations of content, where a user can observe job-specific aspects and change a point of view relative to the rendering of the job in 3D, said virtual rendering further including selecting and viewing individual pages of the print job, wherein the virtual rendering is used to validate aspects of the job as a function of the type of user;
receiving user approval for production of the print job; and
signaling such approval and forwarding the print job and virtual rendering for production of the print job.

2. The method of claim 1, further comprising:
adjusting, through the user interface, the job-specific aspects; and
preliminary virtual rendering of the printing job on a user interface using low-resolution representation of content, such that a user can observe job-specific aspects.

3. The method of claim 1, wherein the viewing of individual pages is accomplished in accordance with animation of a page-turning process, so that a user may observe the page as turned, and as it will appear during such turning.

4. The method of claim 3, wherein the animated appearance of the page is controlled in accordance with the aspects of the job.

5. The method of claim 1, further including:
producing the print job; and
concurrent with producing the print job, updating the virtual rendering of the print job to depict the job in a plurality of stages while producing the print job.

6. The method of claim 1, further including:
storing print job details and virtual rendering of the print job; and
subsequently retrieving the job details and virtual rendering for modification of the print job and update of the virtual rendering to depict the modifications.

7. The method of claim 6, further including displaying the print job and update of the virtual rendering to a customer for approval prior to printing.

8. The method of claim 1, wherein the user interface is interactive so that the user is able to explore a plurality of aspects of the print job.

9. The method of claim 1, wherein the virtual rendering is used to validate aspects of the job at a plurality of levels.

10. A method for pre-print visualization of a job to be printed, comprising:
submitting all content of the print job;
virtual rendering of the job in 3D on a user interface using print-quality representations of content, where a user can observe job-specific aspects and change a point of view relative to the rendering of the job in 3D, said virtual rendering further including selecting and viewing individual pages of the print job;
receiving user approval for production of the print job;
signaling such approval and forwarding the print job and virtual rendering for production of the print job;
detecting an unusual condition in the job parameters; and
displaying such condition via the user interface.

11. The method of claim 10, wherein displaying the condition via the user interface includes depicting the conflict in the virtual rendering of the print job.

12. The method of claim 10, further including providing a virtual rendering of the print job for each of a plurality of stages of a print production process, wherein a user may access the virtual rendering to view progress of the print job.

13. The method of claim 10, further including providing a virtual rendering of the completed print job and adding said virtual rendering as the specification for the job, against which the actual product is compared for purposes of quality review.

14. The method of claim 10, wherein the viewing of individual pages is accomplished in accordance with animation of a page-turning process, so that a user may observe the page as turned, and as it will appear during such turning.

15. The method of claim 10, wherein the virtual rendering is used to validate aspects of the job at a plurality of levels.

16. The method of claim 15, further including displaying the print job and update of the virtual rendering to a customer for approval prior to printing.

17. The method of claim 10, wherein the user interface is interactive so that the user is able to explore a plurality of aspects of the print job.

18. A method for pre-print visualization of a job to be printed, comprising:
- submitting all content of the print job;
- virtual rendering of the job in 3D on a user interface using print-quality representations of content, where a user can observe job-specific aspects and change a point of view relative to the rendering of the job in 3D, said virtual rendering further including selecting and viewing individual pages of the print job;
- altering the lighting applied in the virtual rendering so as to indicate specific aspects of the print job;
- receiving user approval for production of the print job; and
- signaling such approval and forwarding the print job and virtual rendering for production of the print job.

19. A pre-print virtual rendering system, comprising:
- a print job request in a job definition format, the job definition format identifying a set of print job aspects to be completed during execution of the print job;
- memory for storing the print job and data defining at least one printing environment in which the print job will be rendered;
- a video display system having a video processor and video display;
- a processor operatively associated with said video display system, operating in response to pre-programmed instructions and at least one aspect of the print job as defined by the job definition format, to create at least one 3D display object, where said object is rendered by the video display system in accordance with the print job aspect;
- a user-interface, operatively associated with said processor, said user-interface, wherein said user interface further comprises means for indicating a conflict between aspects of the print job,
  - displaying the at least one 3D display object from a plurality of perspectives in response to a user's input, and
  - sending in response to a user's selection, a signal to said processor, wherein said signal indicates user approval for production of the print job as depicted in the virtual rendering;
- said processor, in response to the user approval, operating to forward the print job for production.

20. The pre-print virtual rendering system of claim 19, wherein said user interface further includes animation of a page-turning process, so that the user may observe the page as it will appear during turning.

* * * * *